United States Patent Office 2,732,407
Patented Jan. 24, 1956

2,732,407
NEW DIARYLMETHANE DERIVATIVES, THEIR MANUFACTURE AND APPLICATION

Arthur Lambert and Gwyn Eifion Williams, Blackley, Manchester, England, assignors to Imperial Chemical Industries Limited, a corporation of Great Britain No Drawing. Application April 12, 1954,
Serial No. 422,670

Claims priority, application Great Britain April 22, 1953

5 Claims. (Cl. 260—619)

This invention relates to new chemical compounds namely 2:2'-dihydroxy-5:5'-di-methyldiphenylmethanes to the 3 position of which there is attached the tertiary carbon atom of a tertiary alkyl group of 4-8 carbon atoms and to the 3' position an α-alkylcycloalkyl group, in which the cycloalkyl group is a cyclopentyl, methylcyclopentyl, cyclohexyl or methylcyclohexyl one and the alkyl substituent has not more than 4 carbon atoms, and is attached to the α-carbon atom of the cycloalkyl group, i. e. the carbon atom which is joined to the phenyl radical.

The invention also relates to the manufacture of these new compounds.

We have found that these compounds are both valuable antioxidants for natural and synthetic rubbers and for those oils, fats and waxes which tend to deteriorate in the presence of oxygen and valuable intermediates for the manufacture of other compounds including other antiagers, e. g. metal salts of the same new compounds.

The new compounds may be made by interacting equimolecular proportions of two substituted cresols, one from each of the two types of the general formulae

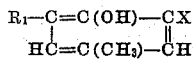

and

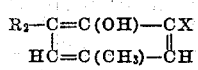

in which R₁ stands for a tertiary alkyl group of 4–8 carbon atoms, attached at a tertiary carbon atom, R₂ stands for an α-alkylcycloalkyl group as defined above and X stands for H or for either a —CH₂OH or a —CH₂Cl group, subject to the condition that one and only one of the two cresols which are interacted carries either a —CH₂OH group, or a —CH₂Cl group.

More particularly the new compounds may be made by combining one molecular proportion of a substituted cresol from one of the two types of the general formulae

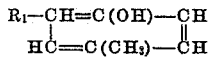

and

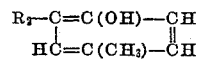

in which R₁ and R₂ stand for the same as above with one molecular proportion of formaldehyde in the presence of a basic catalyst and then interacting the resulting product with one molecular proportion of a substituted cresol from the other type.

Alternatively, one molecular proportion of the one cresol may be interacted with one molecular proportion of formaldehyde in the presence of anhydrous hydrogen chloride and the resulting chloromethyl derivative then interacted with one molecular proportion of the other cresol.

We have also found that the normal and basic aluminium, barium, calcium, magnesium, strontium, and zinc salts of the above new compounds are likewise valuable antioxidants for natural and synthetic rubbers.

These salts, which are themselves new, may be made from the above new compounds according to known methods of salt formation.

Both the new compounds and their salts have not only excellent preservative properties in rubber but are unexcelled in non-staining properties and also have excellent physical properties, which make them well adapted for use in the mechanical processes employed in manufacturing rubber articles. They are also well adapted for addition to latices of both natural and synthetic rubber and for stabilizing the latter. They are also eminently suitable for use in the manufacture of cellular and sponge articles from natural and synthetic rubbers.

The antioxidants are employed in the manufacture of rubber and rubber articles according to the usual methods. Thus they may for example be mixed with the rubber along with vulcanising and other ingredients and the resulting mixes then cured either at ambient temperature or by heat treatment or they may be mixed with rubber along with other compounding ingredients and the mixtures vulcanised by treatment with sulphur monochloride in the cold. The antioxidants are effective in proportions of from about ¼ to 2 per cent of the weight of the rubber.

The synthetic rubbers which may be used include for example polymers of butadiene-1:3 and 2-chlorobutadiene-1:3 and copolymers of either of these compounds with acrylonitrile, styrene, methyl methacrylate and other well known polymerisable compounds which are used in the manufacture of these rubbers.

The following examples in which parts are by weight illustrate but do not limit the invention.

Example 1

A solution of 20 parts of 2-α-methylcyclohexyl-4-methylphenol (made by combining 1-methylcyclohexene and p-cresol in the presence of conc. sulphuric acid: M. P. 60–61° C.) in 20 parts of light petroleum (B. P. 40–60° C.) is stirred with 20 parts of 35% aqueous formaldehyde and 118 parts of hydrochloric acid (S. G. 1.18) at 0–5° C. while dry hydrogen chloride is passed in until the mixture is saturated with the gas. After stirring for an hour, the petrol layer is separated, washed with saturated brine and dried over calcium chloride. A solution of 30 parts of 2-tert.-butyl-4-methylphenol in 30 parts of light petroleum (B. P. 40–65° C.) is added and the mixture kept at room temperature for 16 hours. The light petroleum is then removed by distillation and the residue heated at 140° C. for ½ hour. The product is dissolved in 100 parts of light petroleum (B. P. 40–60° C.), washed free from acid with saturated brine and distilled. After removal of the light petroleum and unreacted 2-tert.-butyl-4-methylphenol, 2:2'-dihydroxy-3-α-methylcyclohexyl-3'-tert.-butyl-5:5'-dimethyldiphenylmethane is collected as an almost colourless resin B. P. 200–225° C./0.1 mm. which crystallises from light petroleum (B. P. 40–60° C)., M. P. 89–91° C.

Example 2

Vulcanisable rubber stocks of the following compositions were prepared by the usual process of mixing using as the antioxidant the 2:2'-dihydroxy-3-α-methylcyclohexyl-3' - tert.-butyl-5:5'-dimethyldiphenylmethane prepared in Example 1 and also using no antioxidant.

| Mix | A | B |
|---|---|---|
| Pale crepe natural rubber | 100 | 100 |
| Zinc oxide | 10 | 10 |
| Blanc fixe | 75 | 75 |
| Stearic acid | 1 | 1 |
| Sulphur | 3 | 3 |
| Diphenyl guanidine | 0.5 | 0.5 |
| Antioxidant | | 1 |

Sheets of each mix were cured for 75 minutes at 141° C. and ageing tests were carried out on the vulcanisates. The results of the ageing tests were as follows:

|  | Tensile strength (kg./cm.) | |
|---|---|---|
|  | A | B |
| Unaged | 190 | 187 |
| Aged in bomb at 70° C. and 300 p. s. i. oxygen pressure for: | | |
| 8 days | Perished | 95 |
| 12 days | do | 98 |
| 16 days | do | 71 |

*Example 3*

2:2'-Dihydroxy - 3 - α - methylcyclohexyl-3'-(1:1:3:3-tetramethylbutyl) - 5:5' - dimethyldiphenylmethane is made by the same process as that of Example 1, but using 2 - (1:1:3:3-tetramethylbutyl)-4-methylphenol in place of 2-tert.-butyl-4-methylphenol, and has B. P. 235–245° C./1.0 mm.

Vulcanisable rubber stocks of the following compositions were prepared by the usual process of mixing, using as the antioxidant 2:2'-dihydroxy-3-α-methylcyclohexyl-3'-(1:1:3:3-tetramethylbutyl)-5:5' - dimethyldiphenylmethane and also using no antioxidant.

| Mix | A | B |
|---|---|---|
| Pale crepe natural rubber | 100 | 100 |
| Zinc oxide | 10 | 10 |
| Blanc fixe | 75 | 75 |
| Stearic acid | 1 | 1 |
| Titanium dioxide | 10 | 10 |
| Sulphur | 2 | 2 |
| Zinc diethyldithiocarbamate | 0.375 | 0.375 |
| Antioxidant | | 1 |

Sheets of each mix were cured for 12 minutes at 125° C. and ageing tests were carried out on the vulcanisates. The results of the ageing tests were as follows:

|  | Tensile strength (kg./cm.²) | |
|---|---|---|
|  | A | B |
| Unaged | 184 | 159 |
| Aged in bomb at 70° C. and 300 p. s. i. oxygen pressure for: | | |
| 8 days | perished | 132 |
| 12 days | do | 120 |
| 16 days | do | 116 |

*Example 4*

2:2'-dihydroxy - 3 - α-methylcyclopentyl-3'-tert.-butyl-5:5'-dimethyldiphenylmethane is prepared by the same process as that of Example 1 but 2-α-methylcyclopentyl-4-methylphenol is used in place of 2-α-methylcyclohexyl-4-methylphenol. It has B. P. 200–231° C./0.5 mm.

Vulcanisable rubber stocks were prepared and cured and tested as in Example 3 with the following results:

|  | Tensile strength (kg./cm.²) | |
|---|---|---|
|  | A | B |
| Unaged | 184 | 166 |
| Aged in bomb at 70° C. and 300 p. s. i. oxygen pressure for: | | |
| 8 days | Perished | 136 |
| 12 days | do | 123 |
| 16 days | do | 125 |

What we claim is:

1. A compound selected from the group consisting of 2:2'-dihydroxy-5:5'-dimethyldiphenylmethanes to the 3 position of which there is attached the tertiary carbon atom of a tertiary alkyl group of 4–8 carbon atoms and to the 3' position an α-alkylcycloalkyl group, in which the cycloalkyl substituent is selected from the group consisting of cyclopentyl, methylcyclopentyl, cyclohexyl and methylcyclohexyl substituents and the alkyl substituent has not more than 4 carbon atoms, and is attached to the α-carbon atom of the cycloalkyl group, and the normal and basic aluminum, barium, calcium, magnesium, strontium and zinc salts of these compounds.

2. 2:2' - dihydroxy - 3 - α - methylcyclohexyl-3'-tert.-butyl-5:5'-dimethyldiphenylmethane.

3. 2:2' - dihydroxy-3-α-methylcyclohexyl - 3' - (1:1:3:3-tetramethylbutyl)-5:5'-dimethyldiphenylmethane.

4. 2:2' - dihydroxy-3-α-methylcylopentyl-5'-tert.-butyl-5:5'-dimethyldiphenylmethane.

5. Process for the manufacture of a compound as claimed in claim 1, which comprises interacting equimolecular proportions of two substituted cresols one from each of the two types of the general formulae:

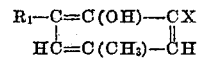

and

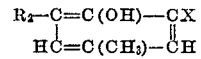

in which $R_1$ stands for a tertiary alkyl group of 4–8 carbon atoms, attached to a tertiary carbon atom, $R_2$ stands for an α-alkylcycloalkyl group, in which the cycloalkyl substituent is selected from the group consisting of cyclopentyl, methylcyclopentyl, cyclohexyl and methylcyclohexyl and the alkyl group has not more than 4 carbon atoms, and is attached to the α-carbon atom of the cycloalkyl group, and X stands for a member of the group conssiting of H, —CH₂OH and —CH₂Cl, subject to the condition that in at least one of the cresols X is hydrogen.

References Cited in the file of this patent

UNITED STATES PATENTS

| 1,961,397 | Schoeller et al. | June 5, 1934 |
| 1,989,788 | Calcott et al. | Feb. 5, 1935 |
| 2,162,172 | Honel et al. | June 13, 1939 |
| 2,514,209 | Ambelang | July 4, 1950 |
| 2,515,907 | Stevens et al. | July 18, 1950 |
| 2,628,953 | Newby | Feb. 17, 1953 |